May 15, 1962 F. J. FISHMAN ET AL 3,035,206

MEANS FOR AND METHOD OF GENERATING ELECTRICAL AND MAGNETIC PULSES

Filed Oct. 10, 1958 5 Sheets-Sheet 1

FRANK J. FISHMAN
GEORGE SARGENT JANES
ARTHUR R. KANTROWITZ
HARRY E. PETSCHEK
*INVENTORS*

BY Alden D. Redfield
Warren Kunz
ATTORNEYS

May 15, 1962 F. J. FISHMAN ET AL 3,035,206

MEANS FOR AND METHOD OF GENERATING ELECTRICAL AND MAGNETIC PULSES

Filed Oct. 10, 1958 5 Sheets-Sheet 2

FRANK J. FISHMAN
GEORGE SARGENT JANES
ARTHUR R. KANTROWITZ
HARRY E. PETSCHEK
*INVENTORS*

BY Alden D Redfield
Warren Kunz
ATTORNEYS

May 15, 1962 F. J. FISHMAN ET AL 3,035,206

MEANS FOR AND METHOD OF GENERATING ELECTRICAL AND MAGNETIC PULSES

Filed Oct. 10, 1958 5 Sheets-Sheet 3

FRANK J. FISHMAN
GEORGE SARGENT JANES
ARTHUR R. KANTROWITZ
HARRY E. PETSCHEK
*INVENTORS*

BY Alden D. Redfield
Warren Kunz
ATTORNEYS

FRANK J. FISHMAN
GEORGE SARGENT JANES
ARTHUR R. KANTROWITZ
HARRY E. PETSCHEK
INVENTORS

BY Alden D. Redfield
Warren Hunt
ATTORNEYS

FRANK J. FISHMAN
GEORGE SARGENT JANES
ARTHUR R. KANTROWITZ
HARRY E. PETSCHEK
*INVENTORS*

BY Alden D. Redfield
Warren Kunz
ATTORNEYS

3,035,206
MEANS FOR AND METHOD OF GENERATING ELECTRICAL AND MAGNETIC PULSES

Frank J. Fishman, Melrose, George Sargent Janes, South Lincoln, Arthur R. Kantrowitz, Arlington, and Harry E. Petschek, Reading, Mass., assignors to Avco Manufacturing Corporation, Cincinnati, Ohio, a corporation of Delaware Filed Oct. 10, 1958, Ser. No. 766,552
18 Claims. (Cl. 315—244)

The present invention relates to a means for and method of generating large pulses of electrical energy and more specifically to a magnetic pulse generator which may be used to accelerate gases rapidly. Although the invention is not limited to such applications, it may be used to produce magnetic surges within a low pressure mass of gas whereby the gas is subjected to very large accelerations producing temperatures in the order of $10^{6}$° Kelvin.

More specifically the invention relates to a device for inductively storing electrical energy and for suddenly discharging the energy through an associated load. In accordance with the present invention, sudden discharge of the energy may be effected by sudden interruption of the current flowing in the inductance, which is used as an energy storage medium.

Recent studies in the field of magnetohydrodynamics have led to investigations of gaseous phenomena under extremely high temperature conditions. When such phenomena are fully understood, it is believed that they will lead to the successful production of power by fusion of elements and may make possible dynamic strides in the field of space propulsion. Through use of the present invention, it is possible to study such phenomena in gases under conditions where the Larmor radius of ions within the gas is in the order of one millimeter and the mean free path of collisions is much larger, in the order of one centimeter. Such conditions prevail in gases having a temperature $10^{6}$° Kelvin at particle densities in the order of $10^{16}$ per cubic centimeter.

In accordance with the present invention, high temperature is produced in a low pressure gaseous medium by accelerating the gas to extremely high velocities and allowing the kinetic energy of the gas to be partially randomized by collisions within a fast moving shock front. A simple calculation based on conservation equations for mass, momentum and energy (neglecting radiation and wall losses) indicates that an equilibrium temperature of $10^{6}$° Kelvin can be attained behind a shock front moving at 23 cm./$\mu$sec. in deuterium or 32 cm./$\mu$sec. in hydrogen. Such velocities are beyond the range of conventional chemical shock tubes where the maximum theoretical velocity even in hydrogen is in the order of one centimeter per microsecond.

For purposes of illustration the invention will be described with particular application to the acceleration of ionized hydrogen gas, although it should be understood that the invention may be used to accelerate other elements in gaseous form and, broadly considered, may be used to advantage whenever a sudden surge of electrical energy is required, as in producing surges of magnetic flux.

Briefly stated, the invention comprises means for storing a large amount of electrical energy, as in a capacitor bank, which may be suddenly connected to an inductance connected in series with switch means through which the circuit is completed. The switch means may take the novel form of a plurality of fine, electrically-conductive wires which suddenly fuse and vaporize as a result of the large current flowing from the capacitor bank.

For convenience, the plurality of wires may be referred to as a "fuse link," the destruction of which breaks the circuit connecting the inductance to the capacitor bank and releases the energy of the associated inductance so that it surges into an associated circuit, which may comprise a series of additional inductances or some special form of load.

In the preferred embodiment of the invention, a plurality of inductances are connected in series to one side of the capacitor bank and a plurality of fuse links are connected in parallel between the inductances and the other side of the capacitor bank. In a modified form of the invention, two inductances are magnetically coupled, one inductance being connected across the capacitor bank and the other inductance being connected in series with a fuse link.

The present invention may be used to generate a sudden surge of magnetic flux around the periphery of a cylindrical volume of low pressure gas. The gas may be partially ionized through provision of a preionization coil, the interaction of the magnetic flux and the electrically conductive, ionized gas inducing a circumferential flow of electrical current within the gas. The interaction of the current with the magnetic field establishes a radial, inwardly directed acceleration of the gas, creating an inwardly moving cylindrical shock front behind which temperatures may rise to extremely high values.

In view of the foregoing, it will be understood that a broad object of the present invention is to provide means for and a method of producing surges of electrical energy and, more specifically, surges of magnetic flux.

It is also within the purview of the invention to provide means for and a method of suddenly accelerating a gaseous medium whereby extreme pressures and temperatures may be created within the medium.

More specific objects of the invention are as follows:

(*a*) Provision of means for inductively storing electrical energy and suddenly discharging the energy to produce a current surge.

(*b*) Provision of means for storing energy in a magnetic field and suddenly releasing the energy to an associated load.

(*c*) Means for suddenly interrupting an electrical circuit through destruction of an associated circuit element.

(*d*) Provision of a plurality of inductive energy storage means in association with a plurality of fuse links whereby a surge of electric current may be established sequentially through the inductive means and the fuse links.

(*e*) Provision of means for establishing interaction of magnetic flux with an induced current whereby a force is created for suddenly accelerating the medium within which the current is induced.

The novel features that we consider characteristic of our invention are set forth in the appended claims; the invention itself, however, both as to its organization and method of operation, together with additional objects and advantages thereof, will best be understood from the following description of specific embodiments when read in conjunction with the accompanying drawings, in which:

*General Description*

Figure 1:
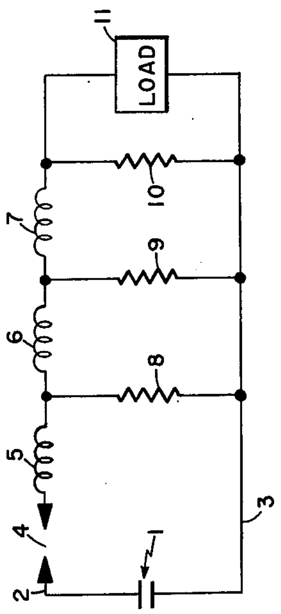
FIG. 1 is a simplified circuit diagram of the preferred form of current surge generator.

The general principles underlying this invention can best be understood by reference to FIG. 1. Shown diagrammatically is a capacitor bank, generally designated 1, which is connected to conductors 2 and 3. A switch in the form of a spark gap is provided at 4, making it possible to complete connection through conductor 2 to a plurality of inductances 5, 6 and 7 which are connected in series. Connected in parallel between each pair of inductances and conductor 3 is a plurality of fuse links 8, 9 and 10. Conductors 2 and 3 are connected with load 11 as indicated.

Using any conventional current source, capacitor bank 1 is charged to a very high potential. When it is desirable to establish a surge of current in load 11, spark gap 4 is triggered, completing the circuit through inductance 5 and fuse link 8. Since the fuse link has a very low resistance and acts substantially like a short circuit, a very large current flows through the inductance 5 and the fuse link. In this way a large amount of energy is stored in the magnetic field associated with inductance 5.

As the current flowing through fuse link 8 increases, the link is rapidly heated until it fuses and eventually vaporizes as will be described later in the application. Destruction of the fuse link suddenly breaks the circuit and permits the energy stored in the magnetic field of inductance 5 to surge into inductance 6. The current now flows through inductances 5 and 6 and fuse link 9. Energy stored in the magnetic fields associated with these inductances is suddenly released to inductance 7 when fuse link 9 vaporizes under the large current flow to which it is subjected.

The process is repeated with respect to fuse link 10, the end result of the process being the delivery of a very large surge of current through load 11. In this way the rate of change of current flowing in load 11 can be made several times larger than that which could be obtained by simply connecting the load across the capacitor bank.

Figure 2:
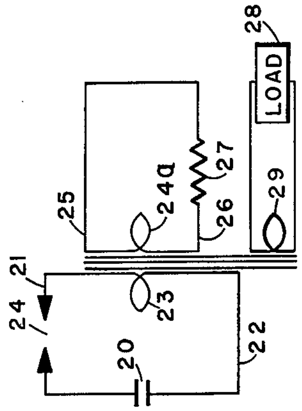
FIG. 2 shows a modified form of current surge generator.

As an alternative, the circuit of FIG. 2 may be employed. This circuit includes a capacitor bank 20 in circuit with conductors 21 and 22 which are connected to a transformer primary 23. In this case, the transformer may simply have single turn coils. When spark gap 24 is triggered, current suddenly flows through primary coil 23, inducing current flow in the right hand portions of the circuit through magnetic coupling of flux with coils **24*a* and 29. Coil 24*a* is connected through conductors 25 and 26 to a shorting fuse link 27. In this configuration, destruction of the fuse link induces a very high voltage in coil 29 and produces a rate of change of current flowing through load 28** greatly in excess of that which could be produced if the fuse link and associated coil were omitted. The energy is initially stored in the stray circuit inductances including the leakage inductance of the transformer.

As far as the basic operating principles of the invention are concerned, the nature of the loads 11 and 28 is immaterial, and the circuit may be adapted to produce either a large surge of current or a surge of magnetic flux, associated with the current, depending upon the nature of the load and the objective to be attained.

Figure 4:
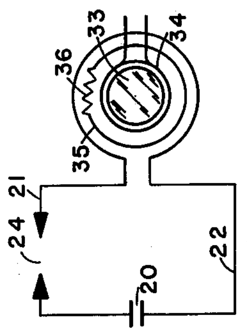
FIG. 4 is a circuit diagram of the modified generator of FIG. 2 in association with means for rapidly accelerating a gaseous medium.
Figure 3:
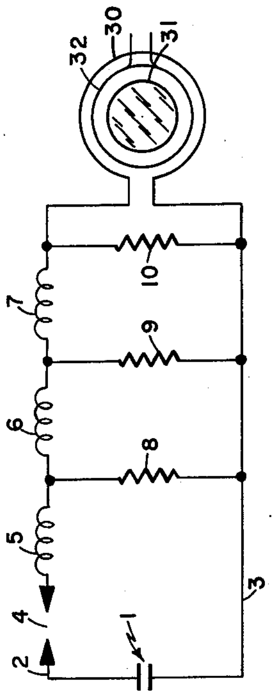
FIG. 3 is a circuit diagram of the preferred current generator in association with means for rapidly accelerating a gaseous medium.

In FIGS. 3 and 4 the circuits of FIGS. 1 and 2 are used for producing high temperatures in gases. Directing attenton first to FIG. 3, the circuit, identified by reference numerals used in FIGURE 1 to identify similar components, is shown connected to a drive coil 30 which surrounds a cylinder 31 containing a low pressure gaseous medium. Also surrounding the cylinder is a preionization coil 32 which may be energized from a radio frequency source to partially ionize the gaseous medium. As the respective fuse links 8, 9 and 10 are vaporized, a sudden surge of magnetic flux is produced around the periphery of cylinder 31. The radially inwardly moving flux induces a circumferential flow of current in the ionized gas and the force resulting from the cross product of the flux and induced current drives the gas radially towards the center of the cylinder, creating an advancing shock wave behind which the gas is compressed and heated.

Directing attention now to FIG. 4, the circuit of FIG. 2, bearing similar reference numerals, is shown in association with a cylinder 33 within which a low pressure gas is partially ionized by coil 34. In this case, however, the secondary coil takes the form of a simple band of material 35 surrounding the exterior of the cylinder. The coil is connected across the ends of a fuse link 36. When the spark gap 24 is first triggered, the fuse link 36 acts like a short circuit and current starts to build up in the band 35, preventing magnetic flux from penetrating into the cylinder containing the gas. After the current has built up to a large value, heating of the fuse link 36 causes it to melt and then vaporize. The resulting high impedance of the band 35 allows the associated flux to leak suddenly into the interior of the cylinder 33 in a time considerably shorter than the original rise time of current in the circuit. The interaction of the flux and current induced within the gas, as described with reference to FIG. 3, occurs in a similar manner, accelerating the gas particles towards the center of the cylinder and producing extremely high temperatures and pressures.

Stated generally, the invention comprises a nonlinear transmission line pulse generator having lumped inductances which successively store energy and then suddenly release it to the next inductance of the transmission line, the energy from the entire transmission line eventually being discharged through a load. Although certain energy losses are involved in vaporizing the fuse links, the nonlinear transmission line is effective in establishing an extremely large rate of change of current, and hence a large rate of change of magnetic flux in excess of that which can be produced by any other known device.

*Description of Gas Accelerator*

FIGS. 5 through 9 illustrate the specific details of a particular form of gas accelerator utilizing the principles of this invention, which has actually been constructed and found effective.

Figure 5:
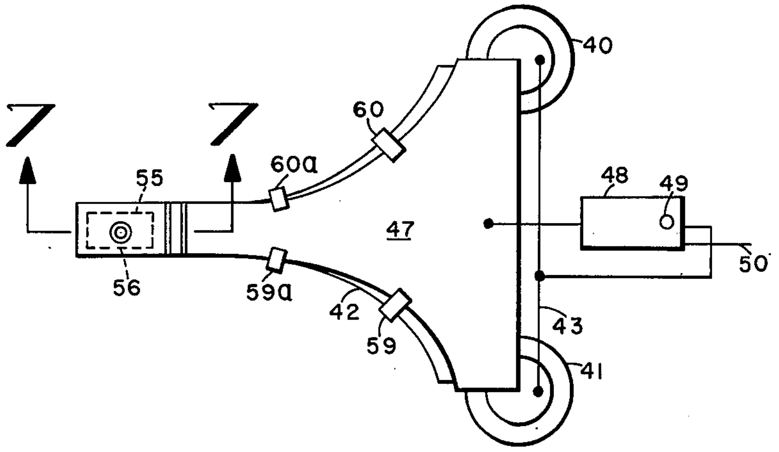
FIG. 5 is a plan view of a device for rapidly accelerating gases and producing high temperatures.
Figure 6:
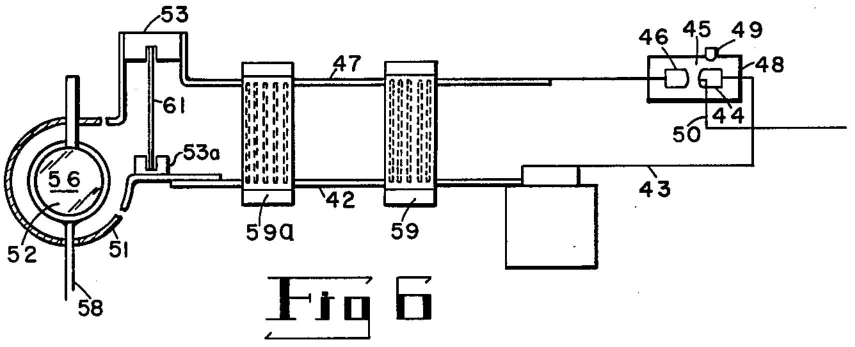
FIG. 6 is a side elevational view of the device shown in FIG. 5.

Referring first to FIGS. 5 and 6 there are shown a pair of large condensers 40 and 41, one side of each condenser being connected in parallel to a large copper plate 42. The other side of each condenser is connected to conductor 43 which in turn in connected to electrode 44 of spark gap 45. The other electrode 46 of the spark gap is connected to upper plate 47. The spark gap comprises a housing 48 of dielectric material to which gas may be supplied under pressure through connection 49. Nitrogen gas at about 140 p.s.i. pressure may be maintained within the housing to prevent spark discharge between the electrodes until such time as a trigger pulse, supplied by conventional means not shown, is applied to trigger electrode 50. At such time, a spark discharge is established between electrodes 44 and 46 and the plates 42 and 47 are effectively connected across the condensers.

The condensers, which have a combined capacity of 1.4 microfarads, may be initially charged to a high potential, such as 66 kilovolts.

Plate 42 is directly connected to a stainless steel band 51. The band is cylindrical in form and surrounds a major portion of the periphery of a Pyrex glass cylinder 52 within which the gas to be accelerated is stored. The opposite end of the band is connected through a metallic block 53 to the upper plate 47. The details of the construction can be better understood by reference to FIG. 7, to which attention is now directed.

Figure 7:
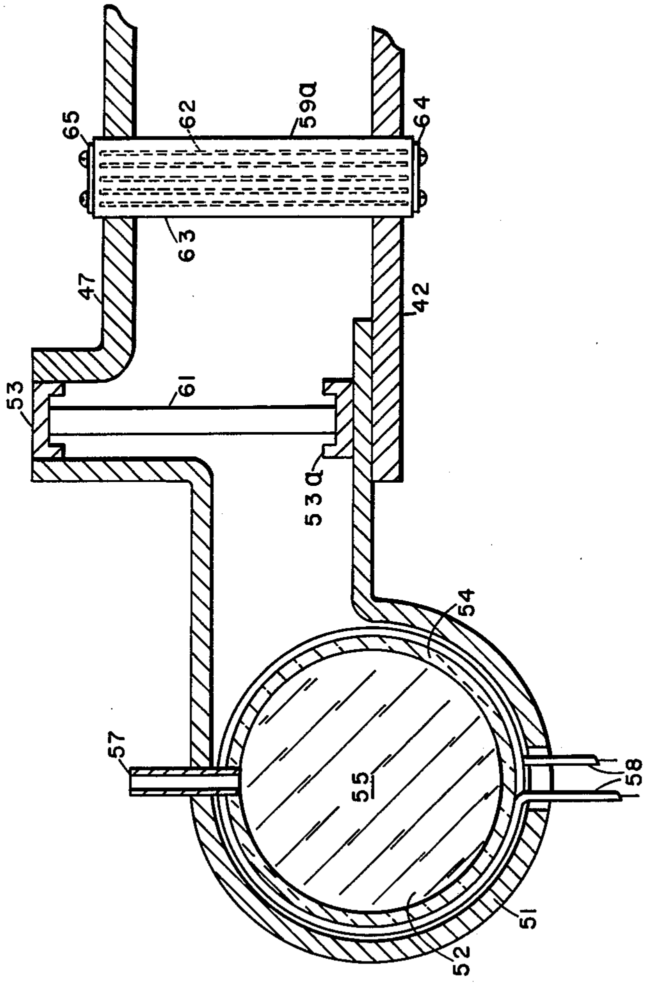
FIG. 7 is a cross sectional view taken on plane 7—7 of FIG. 5 showing certain structural details of the device to an enlarged scale.

As illustrated in FIG. 7, the cylinder 52 comprises a cylindrical wall 54 bounded at its ends by impervious walls 55 and 56 (see FIG. 5). Gas to be accelerated is supplied to the cylinder through conduit 57. Such gas may be hydrogen and may be maintained within the cylinder at a pressure of the order of 100$\mu$ of mercury.

Surrounding the exterior of the cylinder is a preionization coil 58. Construction of the coil is not critical but it has been found convenient to provide three turns of #10 high voltage insulated copper wire about the cylinder. The ends of the coil 58 may be connected to any conventional source of radio frequency energy. It has been found convenient to use a pulsed RF signal of five megacycles at 100,000 volts potential. The RF source should be capable of delivering about two joules of energy.

Connected between plates 42 and 47 are five fuse links designated 59, 59*a*, 60, 60*a*, and 61. The construction of these fuse links may now be considered.

*Fuse Links*

Each fuse link comprises a plurality of parallel electrically conductive wires which are indicated in dash lines at 62 in FIG. 7 as a part of fuse link 59*a*. For convenience these wires may be stuck to one surface of a piece of pressure-sensitive tape 63. The tape in turn is stuck at one end to plate 47 and at the other end to plate 42. Secure electrical connections between the wires and the plates is assured by clamp bars 64 and 65 which are secured, as by bolting, to the associated plates.

Figure 8:
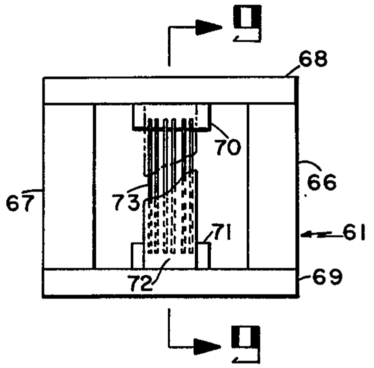
FIG. 8 is an elevational view of a specific form of fuse link.
Figure 9:
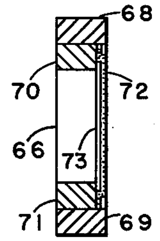
FIG. 9 is a cross sectional view of the fuse link taken on plane 9—9 of FIG. 8.

A preferred form of fuse link is shown at 61. This fuse link is shown in detail in FIGS. 8 and 9, to which reference is made. This fuse link is in the form of a frame having insulating side members 66 and 67 and metal end members 68 and 69 all of which are rigidly joined to form a hollow frame. Blocks 70 and 71 are secured to and project from end members 68 and 69, respectively. As illustrated in FIG. 9, the blocks have a thickness slightly less than that of the end members, making it possible to stretch a piece of pressure sensitive tape 72 across the blocks without its projecting beyond the dimensions of the frame. As illustrated in FIG. 8, a plurality of wires 73 are stuck to the tape and held by the tape in electrical connection with blocks 70 and 71.

A fuse link of the type illustrated in FIGS. 8 and 9 may be slidably supported by the bar 53 and a similar bar 53*a* which are in electrical connection with plates 47 and 42. A new fuse link may easily be inserted between the bars after the completion of a gas acceleration test.

The material of the wires used in the fuse links is not critical. It has been found convenient, however, to use copper wires of one mil diameter with a length between blocks 70 and 71 equal to about two inches. The desiderata of wire material is its conductivity relative to the energy required to vaporize it.

Depending upon the nature of the test to be performed and the initial charge of the capacitor bank, the number of wires used may be varied from 15 to about 50 in any fuse link. Although the wire diameter is quite small, the large number of wires connected in parallel present negligible impedance to current flow.

*Operation*

After the condensers 40 and 41 have been charged, a trigger pulse is applied to trigger electrode 50, establishing spark discharge between electrodes 44 and 46 and completing the circuit through the capacitor bank to the plates 42 and 47. The current surges through the plates and across the fuse links 59 and 60 which short circuit the current flow, practically none of which initially flows through the band and fuse links 59*a*, 60*a*, and 61. The inductance of the plates stores energy during the short period of time before the current flowing through links 59 and 60 causes them to vaporize. As soon as vaporization has occurred, however, the inductively stored energy is released to fuse links 59*a* and 60*a* which in turn fuse, releasing the stored energy to fuse link 61. Fusing of link 61 releases the energy to band 51.

The sudden surge of current through the band, at a rate of rise of about 800,000 amperes per microsecond, establishes an enormous field which advances rapidly into the gas stored within cylinder 52. As the flux lines cut through the electrically conductive gas, a circumferential flow of current is established which reacts with the magnetic field, producing a radially inwardly directed force which accelerates the gas towards the center of the cylinder as has been explained.

*Theory of Operation*

Figure 10:
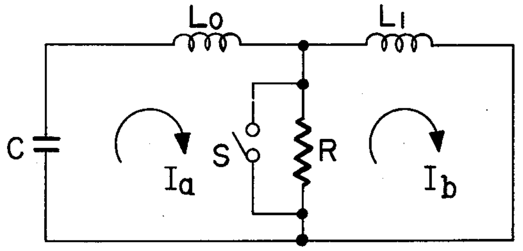
FIG. 10 is a simplified circuit equivalent illustrating the principles of the present invention.

FIG. 10 is a simplified circuit equivalent of a single fuse link pulse generator. In its simplified form, C represents the capacitor bank which is assumed to be charged, $L_0$ the lumped inductance of the transmission line, $L_1$ the load inductance, and R, together with switch S, constitutes the exploding wire fuse link. Prior to vaporization, the fuse link acts like a short circuit with the switch closed, but after vaporization, it acts substantially as an open circuit with the switch open, having an extremely high resistance approaching infinity in value.

Referring to FIG. 10, it will be noted that just before switch S opens there is no current flowing in the right hand portion of the circuit and hence $I_b=0$. $I_a=I_0$ is the initial current flowing around the left hand portion of the circuit, including C, $L_0$, R and S. The energy $U_0$ associated with $I_0$, stored in the field of $L_0$, is:

$$U_0=\frac{L_0I_0^2}{2} \tag{1}$$

After switch S is opened, the following voltage relationships are satisfied:

$$-I_bR+L_0\dot{I}_a+I_aR=0 \tag{2}$$

$$-I_aR+I_bR+LII_b=0 \tag{3}$$

From these equations, plus the boundary conditions, it follows that:

$$I_b=\frac{L_0}{L_1+L_0}I_0\left(1-e^{\frac{-Rt}{L''}}\right)\underset{t\to\infty}{\to}I_0\frac{L_0}{L_1+L_0} \tag{4}$$

where $$L''=\frac{L_0L_1}{L_0+L_1}$$

The energy transfer time is thus $$\frac{L''}{R}$$

which in many cases can be made smaller than $$\sqrt{(L_0+L_1)C}$$

and the final energy is $$U_f=I_b^2\left(\frac{L_0+L_1}{2}\right)\to U_0\left(\frac{L_0}{L_0+L_1}\right) \tag{5}$$

The increase of fuse link resistance as heating occurs tends to decrease the energy transfer time by reducing the $$\frac{L''}{R}$$

ratio.

The foregoing analysis is based on the assumption that the capacitor voltage remains substantially constant and small during the time of switch opening. Experimental vertification indicates that such assumption is justified.

Expanding the foregoing analysis to a system having $n$ fuse links opening in sequence, the net inductance of the system is represented as $$\sum_{i=0}^{i=n} L_i$$

after the $i$th switch has opened. From this it follows that:

$$U_f = U_0 \frac{L_0}{\sum_{i=0}^{i=1} L_i} \times \frac{\sum_{i=0}^{i=1} L_i}{\sum_{i=0}^{i=2} L_i} \times \cdots \frac{\sum_{i=0}^{i=n-1} L_i}{\sum_{i=0}^{i=n} L_i} = U_0 \left( \frac{L_0}{\sum_{i=0}^{i=n} L_i} \right) \quad (6)$$

The results of the foregoing analysis have been confirmed by a number of experiments in which the final magnetic field was shown to be independent of the fuse link configuration so long as the current through the link eventually dropped to zero.

Actual fuse links used in the device shown in FIG. 5 have been made with a sum total of 192 copper wires, each one mil in diameter, the fuse links having a length of two inches. The minimum amount of energy required for heating and vaporizing such as a mass of copper is about 375 joules. This would suggest that the energy eventually delivered to the load would be a function of the mass of copper to be vaporized. Although in an extreme case, involving wires of unusually large diameter, this would be true, it has been found that in practice ample energy is available for vaporizing the fuse links. The dominant factor is the inductive parameter of the circuit and energy losses inherent in complete magnetic energy transfer, both of which are independent of the wire mass.

It was indicated in Equation 5 that the total energy in the system was equal to the product of $$\frac{L_0}{L_0 + L_1}$$

and the original energy $U_0$. For our system having three sets of fuse links, calculation has shown that the value $$\frac{L_0}{\sum_{i=0}^{i=n} L_i}$$

lies between .65 and .70. Assuming an average value of .68 and a total energy in the system as described equal to 2900 joules, it follows that the maximum energy within the system, after destruction of all fuse links, is in the order of 1972 joules, the energy difference being 928 joules, an amount well in excess of the 375 joules required for vaporizing the fuse links. The balance of the energy is dissipated as heat throughout the circuit.

Fuse proportionality is nevertheless a matter to be considered. A controlling consideration is that the fuse link length must not be reduced to such an extent that arcing occurs between the conductors, such as plates 42 and 47. It is apparent, however, that arbitrarily increasing the length of the fuse wires increases the mass of copper and hence the amount of energy that is dissipated in vaporizing the copper.

The question arises of how to proportion the fuse links when different total energies are used in the system. It has been found useful to use as a criterion the value of total energy per unit mass of copper. If this ratio is maintained constant, as well as the resistance through the fuse links, then the time history of the links during destruction will be constant. This has been verified experimentally, and it has been established that any variation in voltage of the capacitor bank should be accompanied by a corresponding linear variation in gap length within the fuse link and the number of wires used in the gap. In other words, the mass of copper should be maintained proportional to the energy which in turn should be maintained proportional to the square of the voltage. This results in a flux pulse at the load occurring with a constant time history regardless of the total energy within the system but with a peak pulse height determined by the voltage of the energy source.

The length of the wire within the fuse link gap cannot be varied arbitrarily. It is apparent that at zero length, the circuit would never be interrupted. At small gap lengths, the break down is sustained and continues after the wires vaporize. Sustained breakdown constitutes continued flow of current through the first fuse link and in effect shields the later fuse links from current flow. It has been found by experiment that a gap length of about two inches is desirable for the device shown in FIGURE 5. With such length, vaporization of the copper is the determining factor in opening the fuse link and no sustained breakdown occurs.

Figure 11:
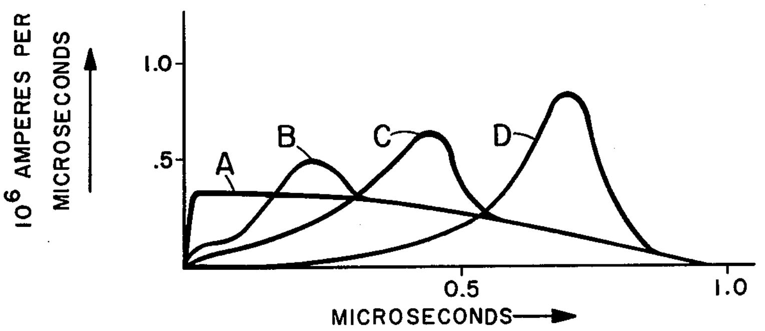
FIG. 11 is a graph of induced voltage-versus-time of a control solenoid associated with the device of FIGS. 5 and 6, the graph showing the effect of using different numbers of fuse links in the device; and, FIG. 12 is a plot of flux-versus-time produced by the device of FIG. 5 when operated without fuse links or with a plurality of fuse links.
Figure 12:
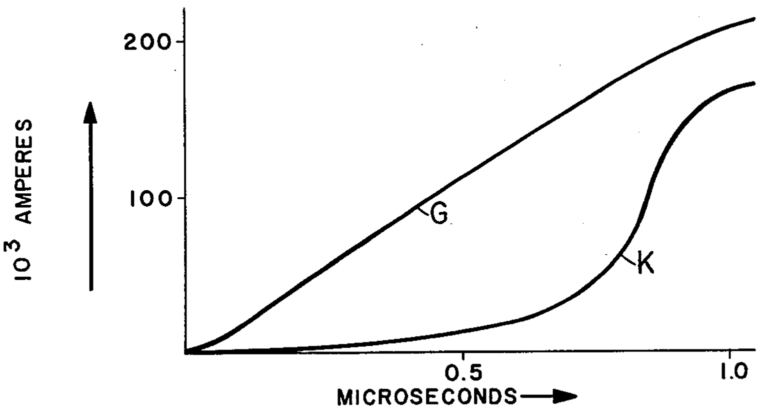

The effect of the invention in practice can be understood from a study of FIGS. 11 and 12. The curves in FIG. 11 are a plot of voltage versus time as induced in a solenoid coil of small diameter (approximately one millimeter and 10 turns) placed at the position of the center of the gas mass normally being accelerated but in this case absent. Curve A is a plot of the induced voltage resulting from capacitor bank discharge without any fuse links installed in the device of FIG. 5. As one would expect with an LC series circuit, the induced voltage signal varies as cos $\omega t$ where $\omega$ is equal to $2\pi$ times the frequency, the initial voltage rise being determined by the inductance of the main drive coil surrounding the cylinder gas.

Curve B shows the variation of induced voltage when a single fuse link is used in the system. It will be noted that in this case, the control coil sees little field until the fuse link opens. This occurs when the current flow through the link is at a maximum at which time the magnetic field lines, like compressed rubber bands, expand into the gas space. The result of both the current and flux line expansion is an increased voltage peak above the value of curve A.

Curves C and D illustrate the increase in induced voltage peaks resulting from the use of 2 and 3 fuse links in the device, respectively. It is readily apparent that higher induced voltages can be obtained through the use of plurality of fuse links, and it necessarily follows that these induced voltages are indicative of increased rate of change of flux lines at the control coil.

In terms of current flow through the drive coil, calculations indicate that an improvement is made in the rate of change of current from 300,000 amperes per microsecond to 800,000 amperes per microsecond.

The integral of the curves shown in FIG. 11 are proportional to the flux so that a plot of flux versus time, as shown in FIG. 12, relates how closely a flux pulse is being approximated. In this figure, curve G indicates the change in flux versus time for the system without fuse links, whereas curve K shows the flux versus time for the system with three fuse links. Although the maximum flux attained by curve G is above that of curve K, due to energy dissipated in the system, it is quite obvious that the rate of change of flux in the middle region of curve K is much greater than that of curve G. As a measure of the difference in rate of change, the ratio of the times required for the flux to increase from 10% to 90% of its maximum can be compared. Results of a number of experiments indicate that the required time can be reduced readily to about 30%, representing a significant improvement over a system using no fuse links.

In terms of flux, an accelerating field of 12,000 gausses is provided in a time comparable to gas velocity divided by radius of cylinder 52, i.e., one-quarter microsecond. The rapid rate of flux increase is necessary to prevent the gas from "running away from" the field before it has reached its peak value.

As indicated by FIGURES 11 and 12, use of a plurality of fuse links that are successively "exploded" materially increases the rate of change of flux. For one thing, by use of several fuse links in sequence, the last link to fuse can be made small—so small, in fact, that it is easily and quickly destroyed. This promotes a clean circuit break and high rate of change of flux. Further, the total time delay in the fusion of a link is proportional to the square of the mass of material in the link. For a given mass of material M, the time delay when the material is used in a single link will be proportional to $M^2$; distribution of this material among $n$ links, however, results in a much smaller over-all delay proportional to $$\frac{M^2}{n}$$

Multiple link systems, however, do tend to reach a practical limit in the number and size of fuse links that can be used. Such limitations arise because of the amount of energy required to fuse the links and the time that must be provided in any event for full capacitor discharge.

*Conclusion*

From the foregoing it will be understood that the present invention provides a means for and method of generating a large pulse of electrical energy, particularly magnetic energy. Although the invention is not limited to gas acceleration, it is particularly useful in such applications and has made it possible to attain gas temperatures in the order of several hundred thousand degrees Kelvin.

The method of measuring the temperatures produced by gas acceleration has not been described since it is beyond the purview of this invention. A conventional method involves photo-optical determination of gas acceleration from which temperature may be calculated. Experiments have indicated that the invention can be used most beneficially at low gas pressures. At high pressures no apparent advantage is gained. This is reasonable since the velocity varies inversely as the density of the gas taken to the one-half power for a given energy input.

The various features and advantages of the invention are thought to be clear from the foregoing description. Others not specifically enumerated will undoubtedly occur to those versed in the art, as likewise will many variations and modifications of the preferred embodiment illustrated, all of which may be achieved without departing from the spirit and scope of the invention as defined by the following claims.

We claim:

1. In combination in a pulse generator, means for storing electrical energy, an inductance, a destructible connection, said inductance and destructible connection being connected in series across said energy storage means, a second inductance and destructible connection connected in series with each other and in parallel across said first destructible connection, and a load connected across said second destructible connection.

2. Apparatus as defined in claim 1 in which said destructible connections constitute fusible links which are destroyed by current flow therethrough in excess of a predetermined value.

3. In combination in a circuit for producing rapid pulses of electrical energy, a source of electrical energy, a plurality of inductances connected in series to said energy source, a plurality of destructible connections in parallel between said inductances and said energy source, and a load connected in parallel across said destructible connection most remote from said energy source.

4. In combination, a series circuit for current flow comprising electrical energy storage means, a fusible link, an inductance, and a spark gap, means for triggering said spark gap to establish current flow through said inductance and said fusible link, and a driver coil connected to receive energy from said inductance after destruction of said fusible link as a result of current flow therethrough.

5. A circuit for producing rapid pulses of energy comprising a source of electrical energy, inductive means connected to said energy source, a destructible connection between said energy source and said inductive means forming a closed path for current flow, and a load connected in parallel across said destructible connection, destruction of said connection interrupting flow of current in said inductive means whereby energy stored by said inductive means is suddenly released to said load.

6. Apparatus as defined in claim 5 in which said destructible connection comprises a fusible link which fuses and vaporizes as a result of current flow therethrough.

7. A circuit for producing rapid pulses of energy comprising a source of electrical energy, inductive means connected to said source, a second inductive means magnetically coupled to said first inductive means, a fast-opening connection in circuit with said second inductive means, a third inductive means magnetically coupled to said second inductive means, and a load connected to said third inductive means.

8. A circuit for producing rapid pulses of energy comprising inductive means, a destructible connection in circuit with said inductive means, a load, a second inductive means connected to said load and magnetically coupled to said first mentioned inductive means, and means for establishing current flow through said inductive means and destructible connection, destruction of said connection releasing energy to said second inductive means and said load.

9. In combination in a device for delivering surges of energy to an associated load, an inductance and a fuse link in series, and means for establishing flow of current through said inductance and fuse link, said fuse link suddenly opening and interrupting flow of current when a predetermined value has been attained whereby energy stored in said inductance as a result of current flow is released to the load.

10. In combination in a device for producing high temperatures in a confined mass of gas, means for confining the gas, means capable of inductively storing energy in close association with said means for confining the gas, a destructible connection in circuit with said energy storage means, and means for establishing flow of current through said energy storage means and destructible connection, said connection, upon destruction, interrupting the flow of current and releasing the inductively stored energy to the gas.

11. In combination in a device for delivering magnetic pulses to a confined mass of gas, an inductance and a fuse link in series, a drive coil connected in parallel with said fuse link, said fuse link vaporizing at a predetermined current flow, said drive coil being physically positioned adjacent the confined mass of gas, means for establishing flow of current through said inductance and fuse link, said fuse link suddenly opening and interrupting flow of current when the predetermined value has been attained, energy stored within said inductance as a result of current flow therethrough being suddenly released to said drive coil, flow of current through said coil producing a magnetic pulse within the confined gas.

12. In combination in a device for producing high temperatures in a mass of gas, means for confining the gas, a conductor and a fusible link in circuit and physically positioned adjacent said means, means for establishing flow of current through said conductor and fuse link, said fuse link opening the circuit and interrupting the current flow after a predetermined value has been attained whereby a surge of energy is delivered by said conductor to the confined mass of gas.

13. In a device for rapidly accelerating a confined mass of gas and producing high temperatures therein, a source of electrical energy, a pair of conductors capable of storing energy in their distributed inductance, means for suddenly releasing energy from said source to said conductors, a plurality of fusible links connected in parallel between said conductors, and a drive coil connected between said conductors and surrounding the mass of gas, flow of current through said conductors and said fuse links causing said links to open successively whereby a surge of energy is suddenly delivered to said drive coil, said drive coil establishing a large rate of change of flux within the confined mass of gas.

14. Apparatus as defined in claim 13 and, in addition, a preionization coil associated with the gas for ionizing it and rendering it electrically conductive, the flux surge inducing current flow within the gas, the cross product of said induced current and magnetic flux accelerating the gas and creating a shock wave therein in which the gas is rapidly heated.

15. The method of producing a surge of electrical energy which comprises the steps of inductively storing energy by establishing flow of a pulse of current through an inductance and suddenly releasing substantially all of the inductively stored energy by suddenly interrupting the flow of current by means responsive to the amount of current flowing through the inductance.

16. The method of producing a surge of magnetic flux which comprises the steps of storing energy in the field of an inductance by passing current therethrough and suddenly interrupting the flow of current to release the energy and create a surge of flux by destructive heating of an element in the current flow path of the inductance.

17. The method of accelerating a confined mass of gas which comprises ionizing the gas and subjecting the ionized gas to a flux pulse by inductively storing energy by current flow through an inductive means and suddenly interrupting the flow of current by fusing of a fusible element in the path of current flow whereby the stored energy is released as a flux pulse to the gas.

18. The method of producing a surge of electrical energy which comprises the steps of inductively storing energy by establishing flow of current through an inductance and suddenly releasing the inductively stored energy by suddenly interrupting the flow of current by destructive heating of an element in the current flow path of the inductance.

References Cited in the file of this patent

UNITED STATES PATENTS

| | | |
|---|---|---|
| 699,045 | Watson | Apr. 29, 1902 |
| 2,103,030 | Dorgelo | Dec. 21, 1937 |
| 2,446,739 | Bryan | Aug. 10, 1948 |
| 2,557,809 | Willoughby | June 19, 1951 |
| 2,589,417 | Mittelmann | Mar. 18, 1952 |
| 2,826,666 | Cater | Mar. 11, 1958 |
| 2,895,080 | Branker | July 14, 1959 |

UNITED STATES PATENT OFFICE

CERTIFICATE OF CORRECTION

May 15, 1962

Patent No. 3,035,206

Frank J. Fishman et al.

It is hereby certified that error appears in the above numbered patent requiring correction and that the said Letters Patent should read as corrected below.

Column 6, line 52, Equation (3) should appear as shown below instead of as in the patent:

$$-I_aR+I_bR+L_1\dot{I}_b=0$$

column 7, line 34, after "such" strike out "as"; column 8, line 41, after "cylinder" insert -- of --.

Signed and sealed this 11th day of June 1963.

(SEAL)

Attest:

ERNEST W. SWIDER

Attesting Officer

DAVID L. LADD

Commissioner of Patents